United States Patent Office 3,838,030
Patented Sept. 24, 1974

3,838,030
PROCESS FOR PREPARING OF POLYTETRA-
FLUOROETHYLENE RESIN WAX
Tsutomu Kagiya, Kyoto, and Miyuki Hagiwara, Takasaki,
Japan, assignors to Japan Atomic Energy Research
Institute, Tokyo, Japan
No Drawing. Filed Nov. 27, 1972, Ser. No. 309,812
Claims priority, application Japan, Jan. 20, 1971,
46/7,282; Nov. 30, 1971, 46/95,903
Int. Cl. B01j 1/10; C08f 3/24, 3/26
U.S. Cl. 204—159.14                5 Claims

ABSTRACT OF THE DISCLOSURE

A polytetrafluoroethylene resin wax is obtained by decomposing a polytetrafluoroethylene resin by means of an ionizing radiation in the presence of oxygen and hydrogen and/or a halogenated methane. The resulting wax is useful as lubricant, mold releasing agent and the like.

BACKGROUND OF THE INVENTION

(1) Field of the Invention

The present invention relates to a process for preparing a polytetrafluoroethylene resin wax of low degree of polymerization by decomposing polytetrafluoroethylene resin of high degree of polymerization by means of the irradiation with an ionizing radiation, and the resulting resin wax. Particularly, the process comprises irradiation with an ionizing radiation to polytetrafluoroethylene in the presence of oxygen and hydrogen and/or a halogenated methane, characterized by remarkably increasing the decomposition rate of polytetrafluoroethylene.

(2) Description of the Prior Art

It has been well known that polytetrafluoroethylene is a polymer of degradative type of which the main chain in the polymerized molecular chain is preferentially cut off by the irradiation with an ionizing radiation, then, the degree of polymerization of the material is decreased. Moreover, it has been also well known that the main chain is more easily cut off by the irradiation with an ionizing radiation in the presence of air or oxygen, than under evacuation. However, a large amount of dose of the radiation is required, in order to reduce the polymerization degree so that commercially available or recovered polytetrafluoroethylene can be used as the so-called "Wax."

The present inventors found, in the course of basic studies on the degradative reaction of polytetrafluoroethylene by irradiation with an ionizing radiation, that the polytetrafluoroethylene with high degree of polymerization and high melting point is quickly decomposed when the material is irradiated by an ionizing radiation with considerable low dose, in the atmosphere of a gaseous mixture of air or oxygen with hydrogen and/or the vapor of halogenated methane, then, the polytetrafluoroethylene wax with low degree of polymerization and low melting point is resulted. Moreover, it was confirmed, by the infra-red spectroscopic technique, that the resulted substance has almost equivalent molecular structure to the raw material.

SUMMARY OF THE INVENTION

The main object of this invention is to provide a polytetrafluoroethylene wax and a process for preparing the wax, which comprises decomposing a polytetrafluoroethylene resin of high degree of polymerization by means of an ionizing radiation, in the presence of oxygen and hydrogen and/or a halogenated methane.

The polytetrafluoroethylene resin to be employed in this invention is generally a commercially available resin or a waste shaped article thereof, the molecular weight of which is preferably about $10^7$–$10^9$. The resin wax obtained according to this invention is generally a solid powder, preferably having molecular weight of about $10^4$–$10^6$, and is useful as lubricant, mold releasing agent and the like.

Although the reaction mechanism of the present invention has not yet been analysed, it is estimated that the reaction proceeds effectively in the form of a chain reaction, since the active species of the polymer, resulted from the decomposition in which some of the polymers are reacted with oxygen under the irradiation with an ionizing, radiation, change to another radicals by the action of hydrogen and/or a halogenated methane used in the present invention, and the radicals act to the other polymers to form again the active species.

The polytetrafluoroethylene resin in the present invention means a homo polymer or copolymer of tetrafluoroethylene, and it is possible to use any of powdered, shaped or molded form and the like of this material, furthermore even used material which is collected as waste materials or articles, for the purpose of the present invention. The technique of the present invention can also be applied to the decomposition of copolymer comprising various monomers containing tetrafluoroethylene as the major component, and furthermore to the decomposition of the polymer obtained from the monomer in which chlorine and/or bromine atoms are substituted for a part of fluorine atoms attached to tetrafluoroethylene molecule. The copolymer of tetrafluoroethylene and hexafluoroethylene or polytrifluorochloroethylene resin and the like can be illustrated as the typical examples.

DESCRIPTION OF THE PREFERRED EMBODIMENTS

Oxygen and hydrogen and/or halogenated methane as the constituents of the gaseous mixture used in the present invention may be commercially available, and particular severe conditions are not required on the purities and other characteristics of these gaseous materials. Air may be used as substitute for oxygen. The halogenated methane used in the present invention is prepared by substituting halogen atoms such as fluorine, chlorine, bromine and/or iodine for the hydrogen atoms in methane molecule, and the examples of such halogenated methane are, for instance, methyl fluoride, methylene fluoride, trifluoromethane, methyl chloride, methylene chloride, chloroform, carbon tetrachloride, fluorodichloromethane, difluorochloromethane, methyl bromide, methylene bromide, bromoform, fluorodibromomethane, difluorobromomethane and the like.

The mixing mole ratio of oxygen with hydrogen and/or these halogenated methanes can be varied in a wide range, for example about 1:2–1:0.01, depending on the required reaction rate, the molecular weight of the produced wax and the like, and the reaction is usually performed with the mole ratio of about 1:1 or of less content (for example 1:0.03) of hydrogen or halogenated methane. The ratio is effective to prevent the oxidation reaction of excess halogenated methane. Especially, when the halogenated methane having less substitution of halogen and having high content of hydrogen is used, it is necessary to pay particular attention to prevent its oxidation and it is effective to employ this gaseous material for the amount as much as the vapor pressure at the reaction condition. Furthermore, it is effective to mix a reasonable gaseous diluent as the third constituent with above gas mixture and particularly when hydrogen gas is employed. The gaseous diluents for the purpose include an inert gas such as nitrogen, carbon dioxide and a rare gas of helium, argon and xeon group.

The polytetrafluoroethylene resin is irradiated with an ionizing radiation in the atmosphere of the above mentioned gaseous mixture. The irradiation is usually performed at an atmospheric pressure, and the process does not require neither particular reduced nor increased pressure. The radiation herein used is a so-called ionizing radiation such as α-rays, proton beam, β-rays, α-rays, X-rays and accelerated electron beam. There is no necessity for the radiation dose rate to be at a fixed value, and the irradiation is generally performed with the rate in the range of about $10–10^8$ rad/hr., preferably about $10^3–10^6$ rad/hr. The reasonable dose is generally in the range of about $10^4–10^8$ rad, preferably about $10^6–5 \times 10^6$ rad.

The decomposition reaction by the present invention is accelerated by an increase in temperature. However, considerable increasing of the reaction temperature results in an increase of monomer in the product owing to the pyrolysis of the polymer, then, the yield of the wax is decreased. Therefore, it is advantageous to apply this process in the temperature ranging from room temperature to about 500° C., preferably ranging about 200–400° C.

The present invention is further explained in detail hereinafter by the working examples, but these examples should not be taken as limiting the scope of the invention.

The degree of polymerization of the wax given in the examples is estimated by the following equation:

$$\overline{D}_n = \frac{2}{685\,(1/T_m - 1/600)}$$

where $\overline{D}_n$ is the number average degree of polymerization (—) and $T_m$ is the melting point (ok), respectively.

[Example 1]

About 20 g. of commercially available polytetrafluoroethylene powder (m.p.: about 327° C., degree of polymerization: about 10,000) was taken in a cylindrical glass ampoule with an I.D. of 3 cm. and 30 cm. in length and the ampoule was evacuated by a pump. 4500 ml. of a gas mixture, comprising oxygen and the halogenated methane shown in the table in the volume ratio of 1:1, was loaded in a rubber balloon, and the balloon was connected to the evacuated glass ampoule, then the gas mixture was introduced into the ampoule. The ampoule was held at 350° C. by an electric furnace and was irradiated by $^{60}$Co—γ rays with the dose rate of $5 \times 10^4$ rad/hr. for 5.0 hours. The quantities and the melting points of the collected waxy resins are shown in the table.

| Halogenated methane | Polymer collected (g.) | Melting point (° C.) | Estimated degree of polymerization |
|---|---|---|---|
| Trifluoromethane | 20 | 326.2 | 1,460 |
| Difluorochloromethane | 19.5 | 325.6 | 730 |
| Fluorodichloromethane | 19.0 | 322.5 | 243 |

When the irradiation was carried out under the same conditions as above except for the use of air as the atmosphere for comparison, the melting point of the collected polymer was 327.2° C., and the lowering of the melting point was not observed.

[Example 2]

When the irradiation was carried out under the same conditions as those in Example 1 except for the reaction temperature at 325° C. and the reaction time for 16.0 hours, the results shown in the following table were obtained.

| Halogenated methane | Polymer collected (g.) | Melting point (° C.) | Estimated degree of polymerization |
|---|---|---|---|
| Trifluoromethane | 20 | 326.3 | 1,460 |
| Difluorochloromethane | 20 | 326.0 | 1,4607 |
| Fluorodichloromethane | 20 | 324.0 | 417 |

When the irradiation was carried out under the same conditions as above except for the use of air as the atmosphere for comparison, the melting point of the collected polymer was 327.0° C., and the lowering of the melting point was not observed.

[Example 3]

In this example, polytetrafluoroethylene was used in the form of ribbon-like waste chips, and methylene chloride, chloroform and carbon tetrachloride were used as halogenated methane. The irradiation was carried out for 16 hours in the oxygen atmosphere containing the vapor of the above halogenated methane, under the condition similar to those in Example 1. The results were given in the following table.

| Halogenated methane | Polymer collected (g.) | Melting point (° C.) | Estimated degree of polymerization |
|---|---|---|---|
| Methylene chloride | 20 | 324.3 | 417 |
| Chloroform | 20 | 324.2 | 417 |
| Carbon tetrachloride | 20 | 323.9 | 365 |

When the irradiation was carried out under the same conditions as above except for the use of air as the atmosphere for comparison, the melting point of the collected polymer was 327.0° C. and the lowering of the melting point was not observed.

[Example 4]

About 10 g. of commercially available polytetrafluoroethylene powder (m.p.:about 327° C., polymerization degree:about 10,000) was taken in a cylindrical glass ampoule with an I.D. of 3 cm. and 30 cm. in length, and the ampoule was evacuated by a pump. 4500 ml. of a gas mixture, comprising oxygen and hydrogen in the volume ratio of 1:1, was loaded in a rubber balloon, and the balloon was connected to the evacuated glass ampoule, then the gas mixture was introduced into the ampoule. The ampoule was held at 350° C. by an electric furnace and was irradiated by a $^{60}$Co—γ rays with the dose rate of $5 \times 10^4$ rad/hr. for 5.0 hours. The weight quantity of the collected polymer was about 9.8 g. and the melting point measured by means of differential thermal analysis was 321° C. From these facts, it is estimated that the polymerization degree of the polymer was lowered down to 180. Moreover, when the irradiation was carried out under the same conditions as above except for the use of air as the atmosphere for comparison, the melting point of the collected polymer was 327.2° C., and the lowering of the melting point was not observed.

[Example 5]

When the irradiation was carried out under the same conditions as those in Example 4 except for the reaction time for 16.0 hours, the weight of the collected polymer was about 9.6 g. and the melting point was 317° C. From these facts, it is estimated that the degree of polymerization of the polymer was lowered down to about 100. Moreover, when the irradiation was carried out under the same conditions as above except for the use of air as the atmosphere for comparison, the melting point of the collected polymer was 327.0° C., and the lowering of the melting point was not observed.

[Example 6]

When the irradiation was carried out under the same conditions as those in Example 4 except for the atmosphere by a gas mixture comprising oxygen, hydrogen and nitrogen in the volume ratio of 1:1:1, the weight of the collected polymer was 9.8 g. and the melting point was 323.3° C. From these facts, it is estimated that the degree of polymerization of the polymer was lowered down to 290.

What is claimed is:

1. A process for preparing a resin wax of a polymer of tetrafluoroethylene or a copolymer of tetrafluoroethylene comprising a major amount of tetrafluoroethylene, said wax having a molecular weight in the range from about $10^4$ to $10^6$, comprising decomposing an initial polytetrafluoroethylene resin having molecular weight in the range of about $10^7$ to about $10^9$ by applying an ionizing radiation thereto at a dose rate in the range of about 10 to about $10^8$ rad per hour for a total dose in the range of about $10^4$ to $10^8$ rad at a temperature in the range of room temperature to about 500° C. at atmospheric pressure in the presence of oxygen and a material selected from the group consisting of hydrogen, halogenated methane compounds and mixtures thereof, the molar ratio of said oxygen to said material being in the range of about 1:2 to about 1:0.01.

2. The process of Claim 1 in which the total dose of ionizing radiation is in the range of about $10^6$ to about $5 \times 10^6$ rad.

3. The process of Claim 1 in which the temperature at which the process is carried out is in the range of about 200° C. to about 400° C.

4. The process of Claim 1 in which said molar ratio is about 1:1 to about 1:0.03.

5. The process of Claim 1 in which an inert gas is employed as gaseous diluent.

References Cited
UNITED STATES PATENTS

| | | | |
|---|---|---|---|
| 3,080,306 | 3/1963 | Guthrie | 204—159.18 |
| 2,406,153 | 8/1946 | Lewis | 260—92.1 S |
| 3,432,511 | 3/1969 | Reiling | 260—92.1 S |
| 3,287,288 | 11/1966 | Reiling | 260—92.1 S |

HARRY WONG, Jr., Primary Examiner

U.S. Cl. X.R.

204—159.18; 260—87.5 A, 92.1 S